Feb. 14, 1950      W. M. CADE      2,497,293

BRAKE PEDAL LOCK FOR VEHICLES

Filed Oct. 9, 1948

INVENTOR.
W. M. CADE

BY

ATTORNEYS

Patented Feb. 14, 1950

2,497,293

UNITED STATES PATENT OFFICE 2,497,293

BRAKE PEDAL LOCK FOR VEHICLES

William M. Cade, Dubuque, Iowa, assignor to Deere Manufacturing Co., Dubuque, Iowa, a corporation of Iowa Application October 9, 1948, Serial No. 53,737

8 Claims. (Cl. 74—478)

This invention relates to releasable lock means for the brake pedals, for example, of a vehicle such as an agricultural tractor.

The usual agricultural tractor has a pair of rear traction wheels, each of which is provided with its own brake and brake control means. Inasmuch as the rear wheel brakes may be independently controlled, the brakes may be used as means for facilitating steering in sharp turns; that is to say, if the operator desires to make a sharp turn to the left, he can lock the left rear wheel brake and the left rear wheel will serve as a pivot about which the tractor will turn to the left. Similar results may be obtained on right hand turns by controlling the brake for the right hand rear wheel. It is known in tractors of this type to provide releasable means for holding either brake in locked or applied position so that the tractor may be held stationary, as on inclines or when operating a tractor with belt-driven equipment. The conventional locking means comprises some form of hand-operated mechanism or a foot-operated latch which is operative to hold the brake pedal in depressed position. For release, the brake pedal must be further depressed and the latch released. Heretofore, the brake latches have been individually controllable and in many instances it is found that the operator will release one latch and will neglect to release the other, whereupon driving of the tractor forwardly results in pivoting of the tractor about the locked wheel, often resulting in injury to either the tractor or the operator or both.

According to the present invention, improved brake locking or controlling means is provided which incorporates therein a single control means whereby the locks on both brakes are simultaneously released. Another object of the invention is to provide brake-locking means which may be conditioned in advance for locking. A further object of the invention is to provide brake-locking means which may be readily adapted to tractors of conventional construction.

Figure 1:
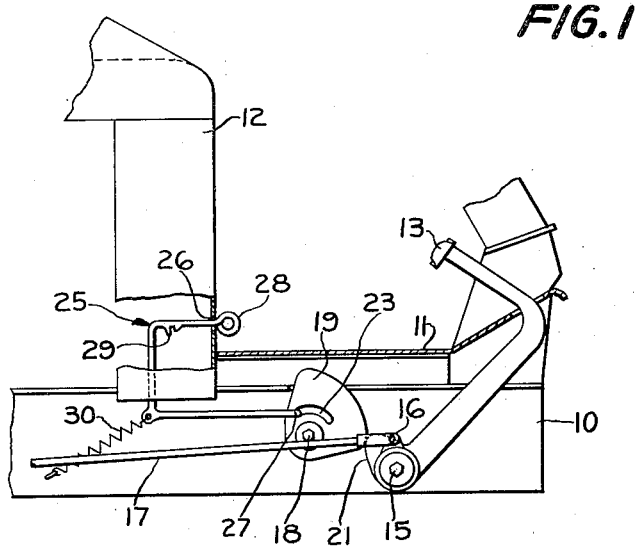
Figure 2:
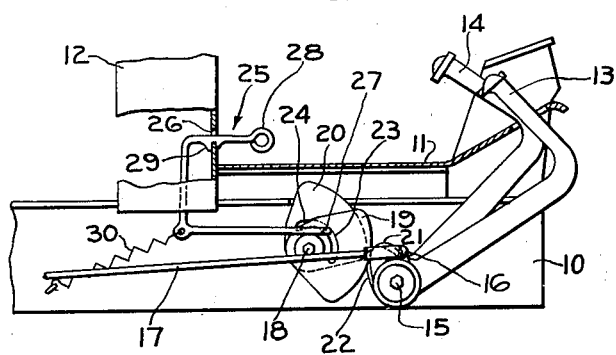
Figure 3:
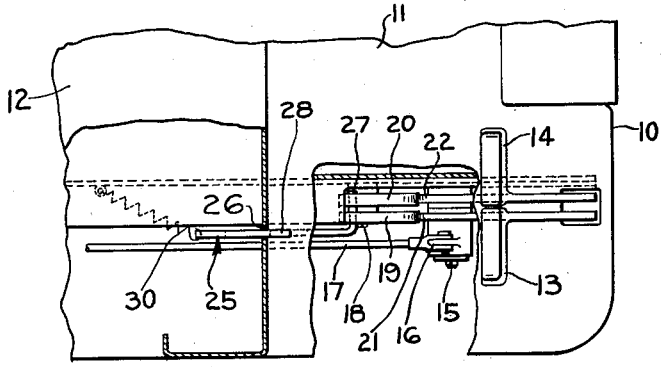

The foregoing and other important objects and desirable features inherent in and encompassed by the invention will become apparent to those versed in the art as a complete disclosure is made of a preferred form of the invention in the following detailed description and accompanying sheet of drawings, in which Figure 1 is a fragmentary side view, partly in section, showing the brake-locking means associated with the brake pedals of a tractor;

Figure 2 is a similar view, showing one of the pedals depressed and one of the locking members in locking position; and Figure 3 is a plan view of the structure shown in Figure 1.

The tractor structure illustrated and about to be described may be considered typical of tractor or vehicle structures in general. The numeral 10 designates the frame or supporting structure of the tractor or vehicle which is shown as having an operator's platform 11 which includes an operator's seat 12. The supporting structure provides means for mounting a right hand actuating member or brake pedal 13 and a left hand actuating member or brake pedal 14 for fore and aft shifting or rocking about a common axis at 15. The right hand pedal 13 is appropriately connected at 16 to a control rod 17 which extends rearwardly and which may be connected to brake means (not shown) for a right hand rear traction wheel (not shown). The left hand brake pedal 14 may be similarly connected by means (not shown) to an independently controlled brake (not shown) for a left hand rear traction wheel (also not shown). The construction in this respect may be generally conventional and an understanding of the various types of brake arrangements is assumed.

The supporting structure 10 is provided at a point rearwardly of the brake pedal axis 15 with means providing a second pivot axis 18 which is parallel to the axis 15. The means providing the axis 18 serves to mount on the support 10 a pair of lock members, one being a right hand lock member 19 and the other being a left hand lock member 20. In the preferred form of the invention, the lock members 19 and 20 are freely and independently rockably carried on the axis 18 and each, by virtue of its design and own weight, is biased for rocking movement forwardly or toward the brake pedal axis 15. Each of the locking members is in the form of a quadrant having its forward edge in the form of an arc which provides a portion interengageable or cooperative with each of a pair of portions 21 and 22 provided respectively on the brake pedals 13 and 14. The general relationship of the locking engagement between the portions 19 and 21 may be seen in Figure 2.

The lock member 19 is provided with an arcuate slot 23 and the member 20 is provided with a similar arcuate slot 24. Opposite ends of each slot provide stop portions on the member. For the purpose of controlling the lock members 19 and 20, there is provided a control member designated generally by the numeral 25 which, in the present case, is in the form of a U-shaped member having an upper leg extended forwardly through an aperture 26 in the front wall of the seat 12 and having its lower leg provided with a transverse portion 27 (Figure 3) which extends freely through the arcuate slots 23 and 24 in the members 19 and 20. The upper leg of the control member 25 is provided with a handle in the form of an eye 28, and further includes means for releasably locking the control member in a forward position, such means in the present case comprising a notched portion 29 cooperating with the front wall of the seat 12 at 26. The control member 25 is biased to a rear position by biasing means in the form of a tension spring 30 which is connected between the control member 25 and a rearwardly disposed point on the supporting structure 10, this means being merely representative of several forms that such means could take.

The operation of the control means is as follows: With all parts in the positions shown in Figures 1 and 3, the brake pedals 13 and 14 are unconfined and may be freely operated by the operator either simultaneously or independently. The control means or member 25 is held in its rear position by the spring 30, and the transverse portion 27 of the control member operates in the slots 23 and 24 to hold both lock members in the position shown in Figure 1, the rear end portions of the slots serving as stops engageable by the portion 27 of the control member 25. The forward portion of each member 19, 20 is clear of the cooperating portion 21, 22 on the brake pedals.

Assuming, for example, that the operator appreciates in advance that he will lock one brake or the other, he may move the control member 25 forwardly and latch it at 29 against the action of the spring 30. If he so moves the control member without depressing either brake pedal 13 or 14, the transverse portion 27 will move forwardly in the arcuate slots 23 and 24 of the lock members 19 and 20. However, the lock members cannot fall forwardly or downwardly because they are respectively held in their upper or rear positions by the portions 21 and 22 on the brake pedals. Normally, the weight of each lock member 19, 20 constitutes biasing means of less energy than that in the spring 30, so that, as long as the control member 25 is not locked at 29, the spring 30, operating through the lower leg of the control member and the transverse portion 27, will hold the members 19 and 20 clear of the brake pedals. After the control member has been moved forwardly and latched or locked at 29, the members 19 and 20 depend upon the portions 21 and 22 for the maintenance of their original positions, as shown in Figure 1.

Now, if the brake pedal 13, for example, is depressed, the brake pedal portion 21 moves out from under the associated lock member 19 and the latter may fall downwardly to the position shown in Figure 2, in which position the portions comprising the portion 21 and arcuate surface on the member 19 interengage to establish a lock precluding return or upward movement of the brake pedal 13. If the brake pedal 14 is not depressed, the other lock member 20 will remain in its upper position as shown.

As stated above, the forward movement of the control member 25, while the lock members 19 and 20 are retained in their upper positions by the brake pedals 13 and 14, results in forward displacement of the transverse portion 27 with respect to the slots 23 and 24. It will thus be seen that each of the slots and its association with the transverse portion 27 provides a lost-motion or one-way connection between the lock members and the control members.

Assuming that the position illustrated in Figure 2 is representative of the results desired by the operator—that is, he wishes to lock only the right hand brake pedal 13—the pedal 13 may be conditioned for release by first releasing the control member 25 from its latched engagement at 29. The spring 30 is now unrestrained by the latch 29 and urges the control member 25 rearwardly. However, the interengagement between the member 19 and the portion 21 of the pedal 13 holds the member 19 in its forward or locking position. The energy of the spring 30 is transmitted through the control member and transverse portion 27 to the member 19, so that, when the brake pedal 13 is depressed further, the member 19 is released from the portion 21 and the spring 30 returns the member 19 to the position of Figure 1.

Assuming that the operator desires to lock both brakes, he may follow the procedure set forth above in connection with locking of the pedal 13, in addition to which he will depress the left hand pedal 14, whereupon the left hand lock member 20 will drop into place to engage the portion 22 on the pedal 14. Thus, both pedals will be locked in depressed position. Upon release of the control member 25 from its latched engagement at 29, the spring 30 will condition both lock members 19 and 20 for return to their upper positions upon depressing of both brake pedals 13 and 14 sufficiently to release the frictional engagement between the portions 21 and 22 and the lock members 19 and 20.

From the foregoing, it will be seen that one of the features of the invention is the arrangement whereby the operator may pre-select one or the other of the locking members 19 or 20 for locking action prior to depressing of either brake pedal 13 or 14. Also, it will be seen that if only one pedal is locked, that pedal will be released when the spring 30 is rendered effective by releasing the control member 25 from its latch at 29. Likewise, both locking members 19 and 20 will be released in the same manner so that both pedals 13 and 14 may be simultaneously released in cases in which both have been previously locked. Features and objects of the invention other than those specifically referred to above will undoubtedly occur to those versed in the art, as will various modifications and alterations in the preferred arrangement illustrated, all of which may be achieved without departing from the spirit and scope of the invention as defined in the appended claims.

What is claimed is:

1. In a vehicle having supporting structure and a pair of brake pedals independently rockable forwardly about a common axis from a normal position to a depressed position, the combination with said pedals of a pair of lock members independently rockable about an axis spaced rearwardly from and parallel to the brake pedal axis, each arranged normally in a rear position and capable of movement by its own weight to a forward position; means providing in each lock member a slot extending toward the brake pedal axis and having front and rear ends; a single control member movable on the supporting structure between front and rear positions and having a portion passing freely through the slots in both lock members, said portion being slidable fore and aft in said slots and said portion, when the control member is in its rear position, engaging the rear ends of the slots to prevent said lock members from falling forwardly; and a pair of lock elements, respectively cooperative with the lock members one on and movable with each pedal and cooperating with the respective lock member when said lock member and pedal are in their rear positions to prevent said lock member from falling forwardly even though the control member is moved to its forward position to dispose its slot-received portion at the forward ends of the slots in said lock members, each lock member and its cooperating lock element having portions interengageable, when the respective brake pedal is depressed and the control member is in its forward position, to releasably lock said depressed pedal in depressed position, and said control member being returnable to its rear position with its portion engaging the rear ends of the slots of both lock members to return said lock members to their rear positions.

2. In a vehicle having supporting structure and a pair of brake pedals independently rockable forwardly about a common axis from a normal position to a depressed position, the combination with said pedals of a pair of lock members independently rockable about an axis spaced rearwardly from and parallel to the brake pedal axis, each arranged normally in a rear position; means biasing each lock member for movement to a forward position; means providing on each lock member front and rear stops; a single control member movable on the supporting structure between front and rear positions and having a portion movable freely fore and aft between said stops and said portion, when the control member is in its rear position, engaging the rear stops of both lock members to prevent said lock members from falling forwardly; and a pair of lock elements, respectively cooperative with the lock members one on and movable with each pedal and cooperating with the respective lock member when said lock member and pedal are in their rear positions to prevent said lock member from falling forwardly even though the control member is moved to its forward position to dispose its portion at the forward stops of said lock members, each lock member and its cooperating lock element having portions interengageable, when the respective brake pedal is depressed and the control member is in its forward position, to releasably lock said depressed pedal in depressed position, and said control member being returnable to its rear position with its portion engaging the rear stops of both lock members to return said lock members to their rear positions.

3. In a vehicle having supporting structure and a pair of brake pedals independently rockable forwardly about a common axis from a normal position to a depressed position, the combination with said pedals of a pair of lock members independently rockable about an axis spaced rearwardly from and parallel to the brake pedal axis, each arranged normally in a rear position; means biasing each lock member for movement to a forward position; means providing on each lock member front and rear stops; a single control member movable on the supporting structure between front and rear positions and having a portion movable freely fore and aft between said stops and said portion, when the control member is in its rear position, engaging the rear stops of both lock members to prevent said lock members from falling forwardly; a pair of lock elements, respectively cooperative with the lock members one on and movable with each pedal and cooperating with the respective lock member when said lock member and pedal are in their rear positions to prevent said lock member from falling forwardly even though the control member is moved to its forward position to dispose its portion at the forward stops of said lock members, each lock member and its cooperating lock element having portions interengageable, when the respective brake pedal is depressed and the control member is in its forward position, to releasably lock said depressed pedal in depressed position, said interengaging portions being releasable upon further depression of the respective pedal and rearward return of the respective lock member; means for releasably latching the control member in its forward position; and means biasing said control member for return to its rear position so that said portion on the control member engages the rear stops on both lock members and to transmit the energy of said control-member biasing means to said lock members to condition said lock members for return to their rear positions upon further depression of the pedals to release the aforesaid interengaging portions on said lock members and lock elements.

4. In a vehicle having supporting structure and a brake pedal rockable forwardly about a rocking axis from a rear, normal position to a forward, depressed position, the combination with the pedal of a lock member carried on an axis rearwardly of and parallel to the pedal axis for movement from a normal, rear position to a forward locking position; means providing a stop on the lock member; a control member movable on the supporting structure from a rear position to a forward position and having a portion engageable with the lock member stop when said control member is in rear position, said portion being movable ahead of said stop so that the control member is movable to its forward position while the lock member is in rear position; means biasing the control member to its rear position; second means, of less energy than the first biasing means, for biasing the lock member to forward position; a lock element movable fore and aft with the pedal and engageable with the lock member when the pedal is in its rear position to prevent forward movement of the lock member even though the control member is in its forward position, said lock element and said lock member being releasably lockable together when said pedal is depressed and said lock member moves forwardly to hold said pedal in depressed position.

5. In a vehicle or the like having a support and an actuating member movable thereon from a first position to a second position and return, the combination with the actuating member of a lock member carried on the support for movement between a normal position clear of the actuating member and a holding position engaging the actuating member in the second position of the latter; means biasing the lock member for movement to its holding position; means connected to the actuating member and engageable with the lock member, when the actuating member is in its first position, for holding the lock member in its normal position; a control member carried by the support for movement between a holding position and a releasing position; means of greater energy than the lock-member biasing means for biasing the control member to holding position; means including a lost-motion connection between the control and lock members providing for holding of the lock member in normal position by the control member when the control member is in holding position and providing for movement of the control member to releasing position relative to the lock member while said lock member is held in normal position by the aforesaid means connected to the actuating member; and releasable means for holding the control member in releasing position against the action of the control-member biasing means.

6. In a vehicle or the like having a support and an actuating member movable thereon from a first position to a second position and return, the combination with the actuating member of a lock member carried on the support for movement between a normal position clear of the actuating member and a holding position engaging the actuating member in the second position of the latter; means biasing the lock member for movement to its holding position; means connected to the actuating member and engageable with the lock member, when the actuating member is in its first position, for holding the lock member in its normal position; a control member carried by the support for movement between a holding position and a releasing position; means normally holding the control member in holding position; means including a lost-motion connection between the control and lock members providing for holding of the lock member in normal position by the control member when the control member is in holding position and providing for movement of the control member to releasing position relative to the lock member while said lock member is held in normal position by the aforesaid means connected to the actuating member; and means for holding the control member in releasing position.

7. In a vehicle or the like having a support and a pair of actuating members similarly arranged and similarly movable independently from a first position to a second position and return, the combination with the actuating members of a pair of lock members, one for each actuating member and each carried on the support for movement between a normal position clear of its associated actuating member and a holding position engaging the actuating member in the second position of the latter; means biasing the lock member for movement to its holding position; means connected to each actuating member and engageable with the associated lock member, when the actuating member is in its first position, for holding the lock member in its normal position; a control member carried by the support for movement between a holding position and a releasing position; means of greater energy than the lock-member biasing means for biasing the control member to holding position; means including a lost-motion connection between the control and both lock members providing for holding of the lock member in normal position by the control member when the control member is in holding position and providing for movement of the control member to releasing position relative to the lock members while either lock member is held in normal position by the aforesaid means on the associated actuating member; and releasable means for holding the control member in releasing position against the action of the control-member biasing means.

8. In a vehicle or the like having a support and a pair of actuating members similarly arranged and similarly movable independently from a first position to a second position and return, the combination with the actuating members of a pair of lock members, one for each actuating member and each carried on the support for movement between a normal position clear of its associated actuating member and a holding position engaging the actuating member in the second position of the latter; means biasing the lock member for movement to its holding position; means connected to each actuating member and engageable with the associated lock member, when the actuating member is in its first position, for holding the lock member in its normal position; a control member carried by the support for movement between a holding position and a releasing position; means normally holding the control member in holding position; means including a lost-motion connection between the control and both lock members providing for holding of the lock member in normal position by the control member when the control member is in holding position and providing for movement of the control member to releasing position relative to the lock members while either lock member is held in normal position by the aforesaid means on the associated actuating member; and means for holding the control member in releasing position.

WILLIAM M. CADE.

REFERENCES CITED

The following references are of record in the file of this patent:

UNITED STATES PATENTS

| Number | Name | Date |
| --- | --- | --- |
| 668,233 | Stull | Feb. 19, 1901 |
| 1,186,009 | Lane | June 6, 1916 |
| 2,468,252 | Borland | Apr. 26, 1949 |